United States Patent

Knight

[15] 3,690,377

[45] Sept. 12, 1972

[54] THE CONSOLIDATION OF UNCONSOLIDATED FORMATIONS

[72] Inventor: Bruce L. Knight, Littleton, Colo.

[73] Assignee: Marathon Oil Company, Findlay, Ohio

[22] Filed: April 5, 1971

[21] Appl. No.: 131,443

[52] U.S. Cl. .................................................. 166/288
[51] Int. Cl. ....................... E21b 33/138, E21b 43/00
[58] Field of Search ...... 166/288, 302, 303, 292, 285, 166/272

[56] References Cited

UNITED STATES PATENTS

| | | | |
|---|---|---|---|
| 978,359 | 12/1910 | Cooper | 166/288 |
| 1,327,268 | 1/1920 | Christians | 166/288 X |
| 2,341,573 | 2/1944 | Reed | 166/288 |
| 2,363,269 | 11/1944 | Schlumberger | 166/288 |
| 3,121,462 | 2/1964 | Martin et al. | 166/288 |
| 3,275,077 | 9/1966 | Smith et al. | 166/288 |
| 3,302,715 | 2/1967 | Smith et al. | 166/288 |
| 3,147,805 | 9/1964 | Goodwin et al. | 166/288 |
| 3,333,636 | 8/1967 | Groves, Jr. et al. | 166/288 |
| 3,437,144 | 4/1969 | Fisher | 166/288 |
| 3,532,168 | 10/1970 | Webb | 166/312 X |

*Primary Examiner*—Stephen J. Novosad
*Attorney*—Joseph C. Herring, Richard C. Willson, Jr. and Jack L. Hummel

[57] ABSTRACT

Unconsolidated subterranean oil-bearing formations are consolidated by simultaneously injecting molten elemental sulfur and a gas into the formation in the immediate vicinity of the wellbore and allowing the molten sulfur to solidify. Optionally, that portion of the formation to be solidified may be treated with a micellar dispersion to remove the formation fluids.

7 Claims, No Drawings

THE CONSOLIDATION OF UNCONSOLIDATED FORMATIONS

BACKGROUND OF THE INVENTION

1. Field of the Invention

This invention pertains to primary, secondary and tertiary recovery of oil from subterranean formations. More specifically, it pertains to an improved means of producing oil from an unconsolidated reservoir formation.

2. Description of the Prior Art

U.S. Pat. No. 978,359 to Cooper teaches cementing of well casing by placing sulfur, and optionally asphaltum, in the bottom of a wellbore. These elements are then melted to cement the casing in place.

U.S. Pat. No. 1,327,268 to Christians teaches sealing crevices in rock formations by pumping molten sulfur through heated pipe into the crevices, and permitting the sulfur to cool.

U.S. Pat. No. 2,341,573 to Reed teaches the injection of molten sulfur into a formation to actually seal and solidify the earth formations immediately above and below the producing zone of the formation. It is postulated that sulfur forms a barrier "impervious to water and other fluids."

U.S. Pat. No. 3,175,611 teaches consolidating unconsolidated formations by injecting sodium silicates into them.

U.S. Pat. No. 3,302,715 to Smith et al teaches the use of a mixture of drilling mud and sulfur as a substitute for metallic casing in a wellbore.

U.S. Pat. No. 3,316,964 teaches the consolidation of an unconsolidated oil-bearing formation by coking the in situ oil by reacting it with a hot gas containing oxygen.

U.S. Pat. No. 3,332,490 teaches consolidating unconsolidated sandstone by introducing a solution of a devitrifiable glass into the formation.

U.S. Pat. No. 3,333,636 to Groves teaches the consolidation of unconsolidated sandstone by injecting into the formation a liquid sulfonating agent sufficient to cause a sulfonation reaction with the oil surrounding the wellbore.

U.S. Pat. No. 3,437,144 to Fisher teaches the injection of a solution of sulfur and oil into an unconsolidated earth formation, and heating the formation sufficiently to produce a char from a chemical reaction of the sulfur and oil.

As is readily seen, the prior art discloses several means of consolidating unconsolidated formations. However, Fisher teaches the only use of elemental sulfur for this purpose, and his invention necessitates a chemical reaction with oil to produce the permeable bond.

SUMMARY OF THE INVENTION

Applicant has discovered that by simultaneously injecting molten elemental sulfur and a gas into an unconsolidated oil-burning subterranean formation, a permeable, consolidated state is developed in the immediate vicinity of the wellbore. The gas may also be injected while the sulfur is solidifying. Optionally, a micellar dispersion may precede the sulfur-gas injection to remove the formation fluids from the immediate vicinity of the wellbore.

DESCRIPTION OF THE INVENTION

This novel and unexpected development appears to contradict several of the teachings of the prior art. Specifically, molten elemental sulfur and gas combined with the unconsolidated and possibly oil-bearing formation not only is able to consolidate the formation, but most importantly, to effect a permeable condition in the resulting consolidation.

It is postulated that this unexpected permeability results from the entrainment of gas bubbles within the sulfur. This gas is entrained as a result of the rapid cooling of the combined sulfur and gas mixture.

The amount of sulfur injected into the formation depends upon the reservoir characteristics, e.g., the size and the degree of unconsolidation of the reservoir in the immediate vicinity of the wellbore. It should be such that the mixture of reservoir sand and sulfur is preferably about 5 to about 50 weight percent sulfur, more preferably about 10 to about 45 weight percent sulfur, and most preferably about 15 to about 30 weight percent sulfur.

The sulfur may be transported downhole in solid form, i.e. slurried with a gas. This eliminates the need for insulated, and optionally heated, transfer lines. The sulfur is melted via a downhole heater, which also serves to preheat the region to be treated.

The sulfur should be injected radially out from the wellbore to the minimum distance desired for reservoir consolidation. If excess sulfur is injected, the subsequent rate of oil production will be decreased. On the other hand, if an insufficient amount of sulfur is used, the reservoir will obviously not be adequately consolidated. For most cases, it is sufficient that the sulfur be injected from a minimum of about 0.5 feet to a maximum of about 15 feet radially out into the formation. Also, the reservoir in the immediate vicinity of the wellbore should be preheated from about 225° F to about 275°F.

This invention, of course, is limited to those reservoirs having an ambient temperature below about 245°F. Reservoirs of higher temperatures would not permit the sulfur to solidify.

Optionally, gas may be forced through the sulfurized portion of the reservoir while the sulfur is in the process of solidifying. This continuous gas flow will increase the rate of sulfur solidification, and provide a resulting consolidation which is more porous than would otherwise be realized.

The gas should be injected at only a very slightly higher pressure than the pressure of the reservoir. It is not generally desired to preheat the gas, although preheating may be useful in controlling rate of sulfur cooling and hence solidification.

Optionally, it may be desirable to cleanse the wellbore of skin damage and remove the formation fluids in the immediate vicinity of the wellbore prior to consolidating the formation. This is accomplished by injecting a micellar dispersion into the formation prior to the injection of the sulfur-gas mixture. For a complete description of micellar dispersions, see U. S. Pat. Nos. 3,254,714, 3,427,006 and 3,506,070.

EXAMPLE 1

Four unconsolidated cylindrical 100 gram sandpacks are fashioned with dry Ottawa sand (60–200 mesh) and varying incremental amounts of sulfur, (See Table 1 for the precise amounts.) The gas permeability (measured at room temperature and 100 psi differential pressure) of Sample A is obtained, since it contains no sulfur. The remaining samples are heated, melting the sulfur; then allowed to cool. Gas permeabilities (measured under the same conditions as for Sample A) are measured for the resulting consolidated samples. The results are as follows:

TABLE 1

| Sample | Dry Sand (wt.%) | Sulfur (wt.%) | Permeability (md) |
|--------|-----------------|---------------|-------------------|
| A | 100 | 0 | $17 \times 10^3$ |
| B | 80 | 20 | $11 \times 10^3$ |
| C | 70 | 30 | $1 \times 10^3$ |
| D | 50 | 50 | 1 |

These results indicate a permeability reduction of only 35 percent when the sample is consolidated with 20 weight percent sulfur.

It should be understood that these examples, along with the invention as a whole, are capable of a number of modifications and variations which will become apparent to those skilled in the art by a reading of the specification and which are to be included within the spirit of the claims appended hereto.

What is claimed is:

1. A process for locally consolidating an unconsolidated oil-bearing subterranean formation having at least one production means in fluid communication therewith, the process comprising:
   a. preheating that portion of the reservoir which is to be consolidated,
   b. injecting into the reservoir molten elemental sulfur for a radial distance of about 0.5 feet to about 15 feet,
   c. injecting a gas simultaneously with the molten sulfur, and then
   d. allowing the molten sulfur to solidify,
thereby forming a permeable, consolidated formation in the immediate vicinity of the production means.

2. The process of claim 1 wherein the temperature of the oil-bearing subterranean formation is below about 245°F.

3. The process of claim 1 wherein a gas is injected through the formation in the immediate vicinity of the wellbore while the sulfur is solidifying.

4. A process for locally consolidating an unconsolidated oil-bearing subterranean formation having at least one production means in fluid communication therewith, the process comprising:
   a. preheating to a temperature of about 225°F to about 275°F that portion of the reservoir which is to be consolidated,
   b. injecting a micellar dispersion into that portion of the reservoir which is to be consolidated,
   c. injecting into the reservoir molten elemental sulfur for a radial distance of about 0.5 feet to about 15 feet, and
   d. allowing the molten sulfur to solidify,
thereby forming a permeable, consolidated formation in the immediate vicinity of the production means.

5. The process of claim 4 wherein the ambient temperature of the subterranean formation is below about 245°F.

6. The process of claim 4 wherein a gas is injected into the formation simultaneously with the molten sulfur.

7. The process of claim 4 wherein a gas is injected into the formation while the molten sulfur is solidifying.

* * * * *

PO-1050
(5/69)

UNITED STATES PATENT OFFICE
CERTIFICATE OF CORRECTION

Patent No. 3,690,377      Dated Sept. 12, 1972

Inventor(s) Bruce L. Knight

It is certified that error appears in the above-identified patent and that said Letters Patent are hereby corrected as shown below:

Col. 1, line 61:      Delete "oil-burning" and insert --oil-bearing--.

Signed and sealed this 23rd day of January 1973.

(SEAL)
Attest:

EDWARD M. FLETCHER, JR.
Attesting Officer

ROBERT GOTTSCHALK
Commissioner of Patents